United States Patent [19]

Lacy

[11] Patent Number: 5,695,581
[45] Date of Patent: Dec. 9, 1997

[54] METHOD FOR TRIMMING THE SHOULDER AREAS OF RETREADED TIRES

[75] Inventor: Floyd A. Lacy, Muscatine, Iowa

[73] Assignee: Bandag Licensing Corporation, Muscatine, Iowa

[21] Appl. No.: 510,901

[22] Filed: Aug. 3, 1995

[51] Int. Cl.$^6$ .................................................. B29D 30/54
[52] U.S. Cl. ........................ 156/96; 156/128.1; 156/267; 157/13
[58] Field of Search .......................... 156/96, 129, 128.1, 156/154, 267, 268; 157/13; 83/951; 451/920

[56] References Cited

U.S. PATENT DOCUMENTS

| | | | |
|---|---|---|---|
| 3,260,297 | 7/1966 | Ebers | 157/13 |
| 4,098,936 | 7/1978 | Rawls | 156/96 |
| 4,174,239 | 11/1979 | Symmes | 156/96 |
| 4,237,955 | 12/1980 | Clayton | 157/13 |
| 4,424,088 | 1/1984 | Durif | 156/96 |
| 5,053,094 | 10/1991 | Detwiler | 156/96 |

*Primary Examiner*—Geoffrey L. Knable
*Attorney, Agent, or Firm*—Foley & Lardner

[57] ABSTRACT

A method and an apparatus for contouring the shoulder areas of retreaded tires is disclosed. A cutter, preferably having a heated blade, is disposed proximate at least one shoulder of a retreaded tire. The retreaded tire is then rotated, while the cutter blade is moved into contact with the side wall of the tire proximate the joint between the tire casing and the tread layer. A portion of the tire casing and the tread layer is cut away along the entire shoulder area of the retreaded tire to provide an aesthetically pleasing contoured surface extending from the tire casing to the tread layer.

16 Claims, 6 Drawing Sheets

METHOD FOR TRIMMING THE SHOULDER AREAS OF RETREADED TIRES

TECHNICAL FIELD

This invention relates generally to a method for making retreaded tires and particularly to a method for trimming the shoulder areas of retreaded tires to provide an aesthetically pleasing transition between the tire casing and the tread layer.

BACKGROUND OF THE INVENTION

Retreaded tires have been available for many years and provide an economical way to gain additional use of a tire casing after the original tread has become worn. According to one conventional method of retreading, sometimes referred to as cold process retreading, the remaining tread on the used tire is removed by a special buffing machine that grinds away the old tread and leaves a buffed surface to which a new layer of tread may be bonded.

Removal of the old tread from the tire casing provides a generally smooth, treadless surface about the circumference of the tire casing. The tire casing is then examined for injuries, skived, and filled with a repair gum. After completion of the skiving process, certain retreading processes require that the buffed surface be sprayed with a tire cement to provide a tacky surface for application of bonding material and new tread. In other applications, the tire cement may be eliminated. In either event, a layer of cushion gum is then disposed intermediate the tire casing and the new tread layer. The cushion layer and tread layer are both cut to a sufficient length to generally extend about the entire circumference of the tire casing along the buffed surface. Typically, the leading edge and trailing edge of the tread layer are buffed, spliced and stapled together to created a retreaded tire assembly ready for curing. The cushion gum is designed to form bonds between the tread and the tire casing during curing.

Following assembly of the tire casing, cushion gum and tread layer, the overall retreaded tire assembly is placed within a flexible rubber envelope. An airtight seal is created between the envelope and the bead of the tire. The entire enveloped tire assembly is placed within a curing chamber, and subjected to pressure and a raised temperature for a specific period of time. The combination of pressure, temperature and time chemically bonds the layer of cushion gum to both the tire casing and the new tire tread.

In present retreading processes, it is important that the layer of cushion gum be sufficiently wide to extend transversely beyond the side edges of the tread layer. Additionally, it is important that the surface of the tire casing be carefully buffed about the shoulder areas of the tire to ensure that the tread layer width is approximately the same as the buffed surface of the casing. If the shoulder areas are not sufficiently buffed and trimmed, the tread layer edges may come loose, and/or the cushion gum extending beyond the tread edges will not bond to casing shoulder. This may have a negative impact on the longevity and appearance of the retreaded tire.

When the layer of cushion gum extends beyond the sides of the tread layer, the aesthetics of the retreaded tire may be detrimentally affected. This is primarily due to remaining flaps or lumps of cushion gum material that remain along the shoulder areas of the retreaded tire after curing. The excess cushion gum, loose tread, or casing shoulders which are wider than the applied tread layer, may cause difficulties in obtaining approval/acceptance by the applicable regulatory authorities and truck drivers for over-the-road use of the retreaded tires.

It would be advantageous to cut away a portion of the retreaded tire along the joint or boundary line formed between the tire casing and the tread layer to provide an aesthetically pleasing and consistent transition between the tire casing and the tread layer.

SUMMARY OF THE INVENTION

The present invention includes a method and an apparatus for trimming the shoulder areas of a retreaded tire. According to certain aspects of the invention, old tire tread is first removed from a tire casing to present a buffed surface. A tread layer is then cut to a length sufficient to encircle the buffed surface along the circumference of the tire casing. A layer of cushion gum is disposed between the buffed surface and the tread layer, and then the combination is heated to form vulcanized bonds therebetween.

Following this curing process, a cutter is located proximate at least one shoulder of the retreaded tire. The cutter and retreaded tire are moved relative to one another in the circumferential direction about the retreaded tire. The cutter is then moved towards the retreaded tire a sufficient distance to cut a portion of the tire casing and the cushion layer along the shoulder area. This creates a contoured surface joining the tire casing and the tread layer.

According to another aspect of the invention, an apparatus is provided for trimming the shoulder areas of a retreaded tire. The apparatus includes a framework and a rotatable rim mounted on the framework. The rotatable rim is configured to receive and hold a retreaded tire. A cutter blade is adapted to cut a portion of at least one of the shoulder areas from the retreaded tire along the entire circumference of the retreaded tire. Preferably, the cutter includes a blade edge that may be heated by an appropriate heater. Additionally, an actuator is connected to the cutter blade to move the cutter blade into and out of cooperation with the retreaded tire.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENT

Figure 1:
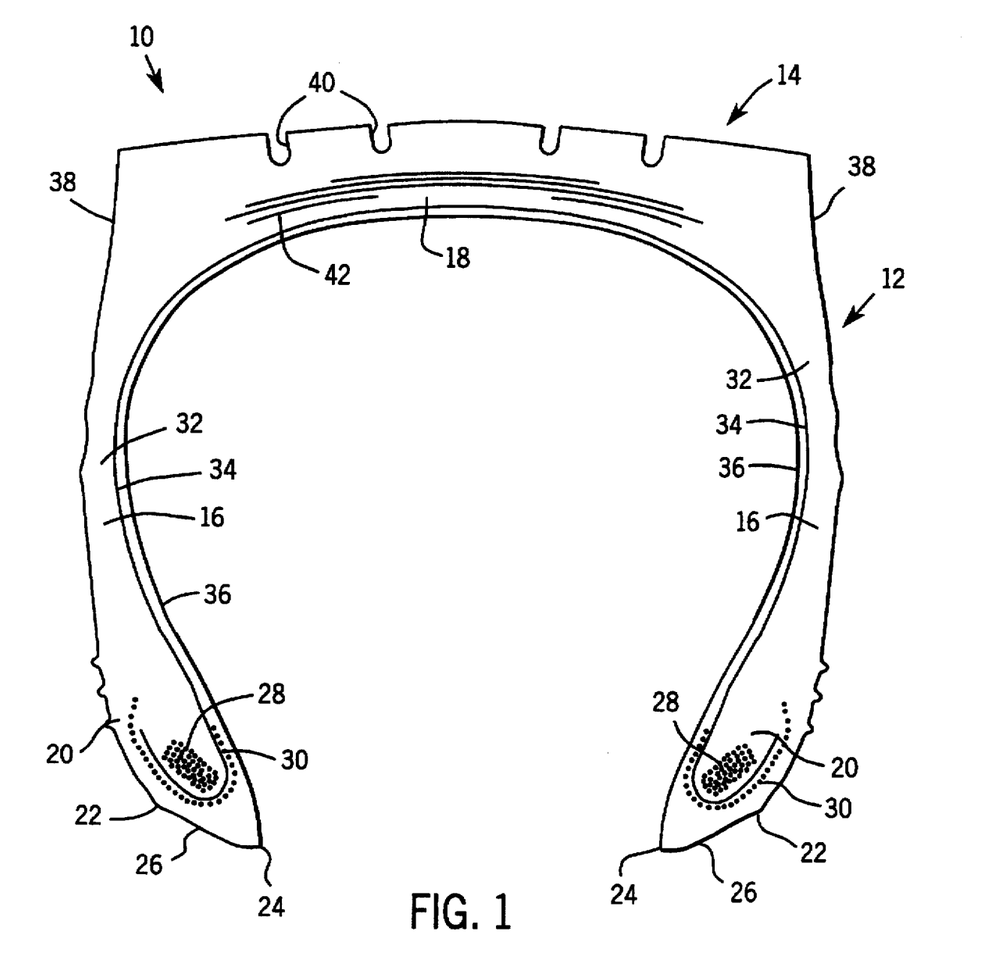
FIG. 1 is a cross-sectional view of an exemplary original tire.

Before explaining the method for removing a portion of the shoulder area from a retreaded tire, it is necessary to briefly explain the procedure for retreading tires and the construction of a typical retreaded tire. Referring generally to FIG. 1, an original tire 10 is shown as having a tire casing 12 from which extends a tire tread 14. After a period of use, tire tread 14 becomes worn and the tire must either be replaced or retreaded. Although the illustrated tire 10 is a radial tire, the invention applies equally to other types of tires, such as bias ply tires.

Tire 10 generally includes a pair of side walls 16 bounded by a generally radially outward wall 18 that spans side walls 16. Each side wall 16 extends radially inward from outer wall 18 and terminates in a bead area 20 designed for mounting on the tire rim (not shown). Bead area 20 may be designed in a variety of configurations depending on, for example, tire type, tire size, or rim configuration. In the illustrated embodiment, each bead area 20 includes a bead heel 22, a bead toe 24 and a bead sole 26. Each bead area 20 may also include a bead bundle 28 and a chafer ply 30. Both bead bundle 28, and chafer ply 30 may include, for example, metal strands or wires to improve the strength of bead area 20.

Side walls 16 may also include multiple layers, such as a rubber layer 32, a radial ply 34, and an inner line 36 which cooperate to provide a strong but flexible side wall. Side walls 16 are joined to radially outward wall 18 and tread 14 through a pair of shoulder areas 38. Shoulder areas 38 extend towards tire tread 14 which, in turn, is disposed radially outwardly from wall 18 of tire casing 12. Tire tread 14 may include a plurality of grooves 40 designed to channel water and provide added traction during certain road conditions. Additionally, outer wall 18 may be strengthened by a plurality of belts or cords 42 extending circumferentially about tire 10 within wall 18 (see FIGS. 1 and 2).

Figure 2:
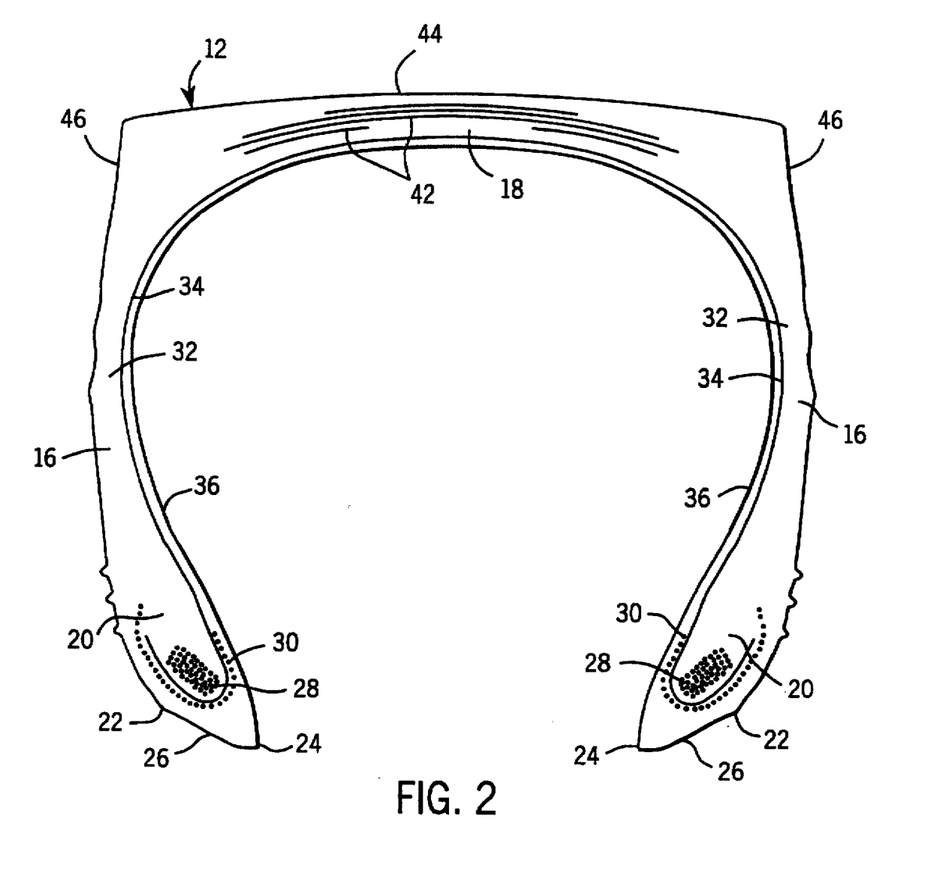
FIG. 2 is a cross-sectional view of the tire of FIG. 1 after the tread layer has been removed from the tire casing.

After tire tread 14 wears beyond a certain limit, tire 10 must either be discarded or retreaded before it should be used on the vehicle for which it was designed. In cold process retreading, the remaining tire tread 14 is removed from tire casing 12 by a buffing machine, such as the Model 8110 buffing machine manufactured by Bandag, Incorporated of Muscatine, Iowa. During the buffing operation, the original tire tread 14 is ground away from tire casing 12, leaving a buffed surface 44 as illustrated in FIG. 2. Buffed surface 44 extends circumferentially about tire casing 12 and also extends transversely across the outside of outer radial wall 18 until it terminates at buffed shoulder areas 46.

Following removal of the used tread layer, a process called skiving and filling is performed on tire casing 12. Skiving is the removal of damaged material from a tire prior to making a repair. Often, the tire casing 12 accumulates holes, nicks or tears due to stones or other sharp objects the tire contacts during use. The injured or damaged area is first ground smooth by an appropriate grinding tool and then filled with repair gum, such as Bandag extruder repair rope, repair gum or some other suitable material. It is necessary to fill the injured areas to the level of buffed surface 44 to avoid air pockets between buffed surface 44 and the later applied tread layer. Trapped air can have negative effects on the longevity of a typical retreaded tire.

Following the skiving and filling operation, new tread layer 50 is wrapped about the circumference of tire casing 12 with a cushion gum layer 52, such as HD30 cushion gum manufactured by Bandag, Incorporated, disposed intermediate buffed surface 44 and tread layer 50. In certain applications, a special tire cement is sprayed over buffed surface 44 and then the combination of tread layer 50 and cushion gum layer 52 are wrapped about the circumference of tire casing 12. In other applications, the tire cement is eliminated and cushion gum layer 52 is initially wrapped about the circumference of tire casing 12 along buffed surface 44 in a slightly circumferentially stretched condition. The cushion gum layer 52 is then stitched, i.e. pressed, against buffed surface 44 to remove any air pockets that may have been trapped between cushion gum layer 52 and buffed surface 44. Following application of cushion gum layer 52, tread layer 50 is placed over cushion gum layer 52 and wrapped about the circumference of tire casing 12.

Figure 3:
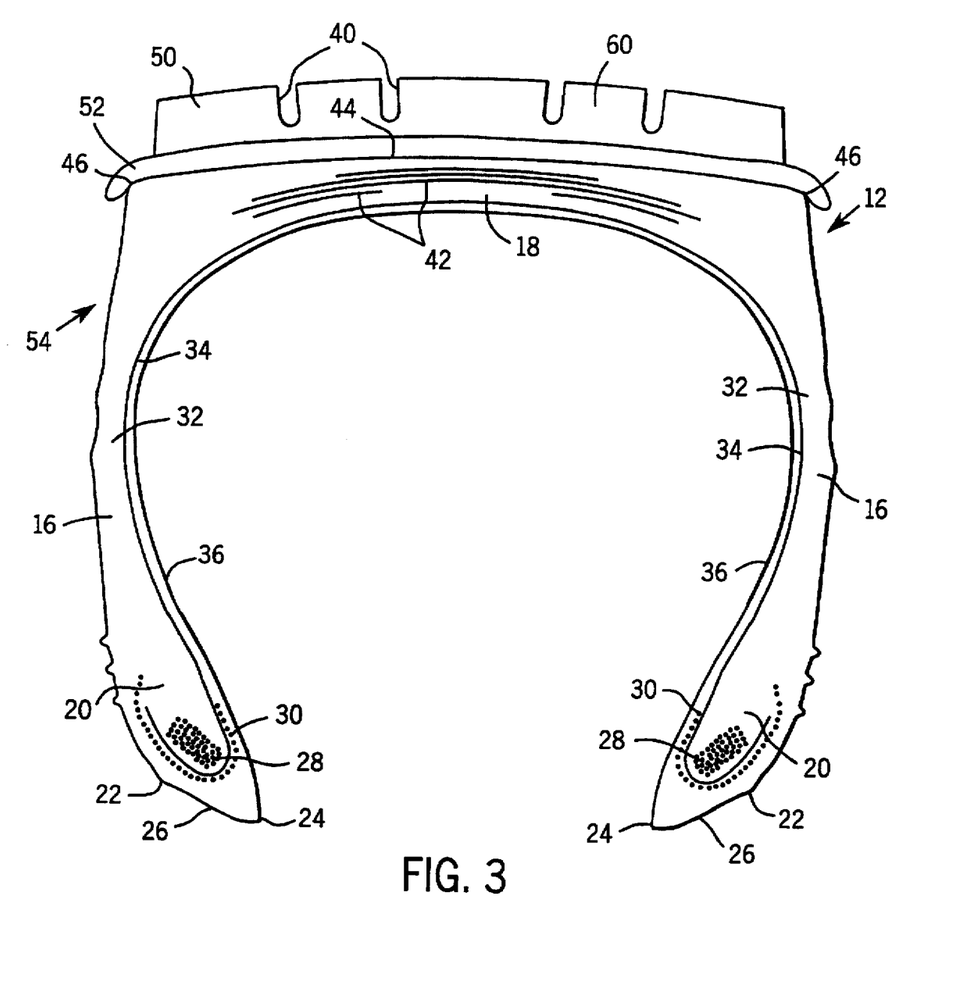
FIG. 3 is a cross-sectional view of the tire casing illustrated in FIG. 2 with the addition of the layer of cushion gum and the new tread layer.

Once cushion gum layer 52 and tread layer 50 are wrapped about tire casing 12, a retreaded tire assembly 54 is created and ready for curing under appropriate heat and pressure conditions (see FIG. 3). To facilitate curing, retreaded tire assembly 54 is first sealed within a rubberized curing envelope, such as the appropriate Bandag, Incorporated curing envelope designed for the particular tire type and size being retreaded.

Tire assembly 54 is then sealed within the curing envelope and placed within a curing chamber, such as the Model 4130 or 4120 curing chamber sold by Bandag, Incorporated. Pressure and heat are applied to the retreaded tire assembly 54 within the curing chamber. The amount of time necessary to cure a given retreaded tire may vary, depending on the size of the tire and the materials used. However, the time must be long enough to create sufficient bonding between the tire casing 12, cushion gum layer 52, and tread layer 50. Generally, the bonding results from vulcanization between the tire casing, cushion gum layer and tread layer. The times, pressures, and temperatures within the curing chamber would be known by one of ordinary skill in the art. However, exemplary parameters during curing within the curing chamber are:

temperature: approximately 210° F.;

pressure: approximately 85 psi; and time: approximately 3½ hours.

The above-listed temperature, pressure, and time parameters are only provided as examples, and are not meant to limit the scope of the invention. As stated previously, the time within the curing chamber may vary, depending on the tire size and tire materials. Additionally, other combinations of temperature and pressure can potentially provide satisfactory results.

Figure 4:
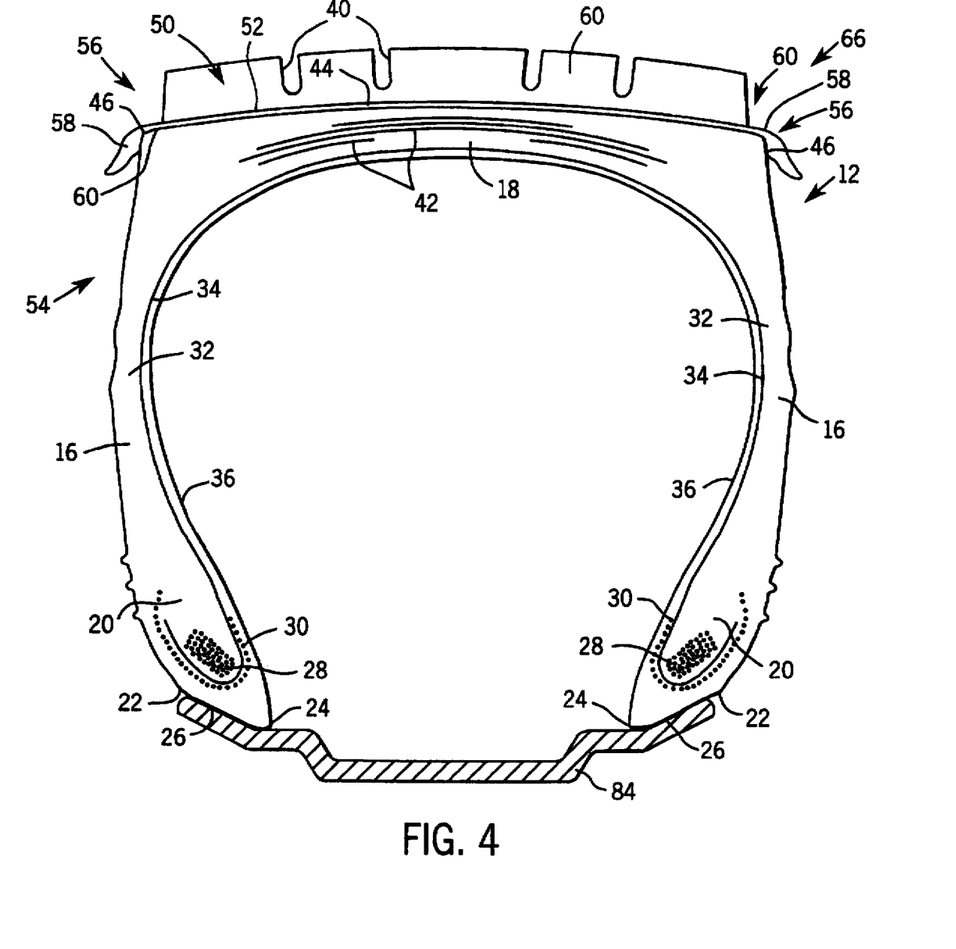
FIG. 4 is a cross-sectional view of the tire assembly of FIG. 3 after curing.

After curing, tread layer 50 is bonded to tire casing 12 as illustrated generally in FIG. 4. As further illustrated, there may be a stepped region 56 between the edge of the tread and the side wall of the tire. Additionally, excess cushion gum material, designated by reference numeral 58, may be left in the area of step 56.

The discontinuity between tread layer 50 and tire casing 12, e.g. stepped region 56, may be somewhat alleviated by buffing the shoulder areas to remove step 56 and carefully selecting the proper width of tread layer 50. However, excess cushion gum 58 still may be noticed where it collects along a seam or boundary line 60 formed between tread layer 50 and tire casing 12. Thus, it would be advantageous to remove step 56 and excess cushion gum 58 to provide a smooth transition from tire casing 12 to tread layer 50 over boundary line 60.

Figure 6:
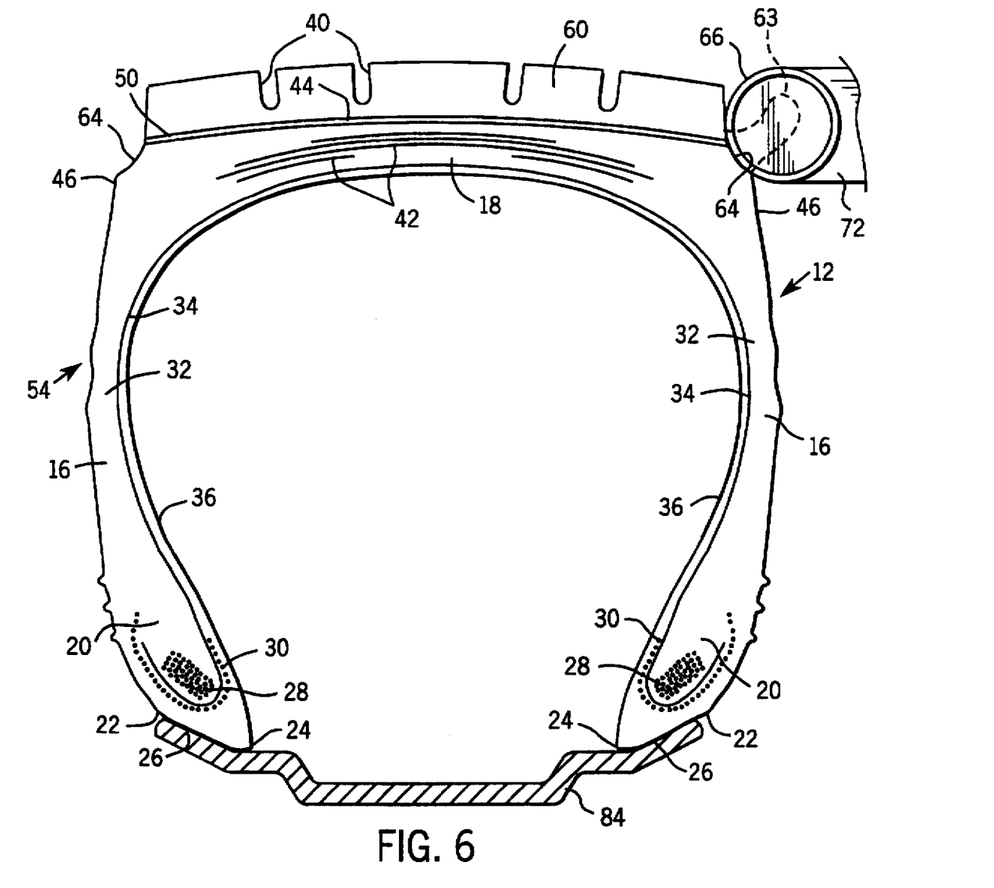
FIG. 6 is a cross-sectional view of the tire casing while the cup cutter is removing a portion of material from the shoulder area of the retreaded tire.

As illustrated in FIGS. 4 and 6, a cutter 62, such as a cup-shaped cutter, is disposed to trim through the shoulder area of retreaded tire assembly 54 to remove a portion of material 63, potentially including a portion of tire casing 12, excess cushion gum 58, and a portion of tread layer 50, to provide a smooth, contoured surface 64 extending from tire casing 12 to tread layer 50 across seam 60. The clean cut, contoured surface 64 improves the appearance of retreaded tire assembly 54 and also facilitates any inspections of the retreaded tire by the applicable regulatory authorities.

Figure 5:
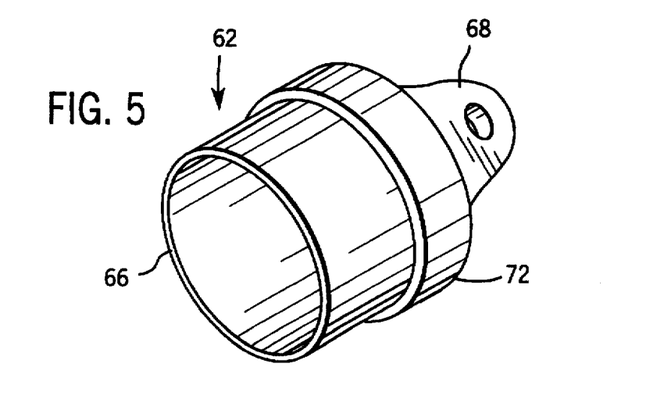
FIG. 5 is a perspective view of a cup cutter according to a preferred embodiment of the invention.

Although cutter 62 may be designed and oriented in a variety of shapes and positions, cutter 62 is preferably cup-shaped, having a blade 66 of generally circular configuration. At the opposite end from blade 66, cutter 62 includes a mounting bracket 68.

To trim the shoulder of retreaded tire assembly 54, cutter 62 is disposed proximate the shoulder of the retreaded tire. The contoured blade edge 66 is disposed along the shoulder of retreaded tire assembly 54 and oriented to potentially provide the appropriate contoured surface 64. Then, a relative movement is created between the cutter 62 and the retreaded tire 54 in the circumferential direction of the tire. Preferably, cutter 62 is held in a stationary position while retreaded tire 54 is rotated in a direction against the orientation of contoured blade edge 66 at a speed of approximately 8 to 72 revolutions per minute. After creating the relative movement between the cutter and retreaded tire, the cutter 62 is moved generally transversely into the shoulder of retreaded tire 54 to a desired cutting depth, as illustrated in FIG. 6. As the retreaded tire is rotated, cutter 62 removes or cuts portion 63 of the shoulder away from the retreaded tire to create the contoured surface 64 about the perimeter of tire casing 12.

In many applications, the cutting away of portion 63 is facilitated by heating the blade. An appropriate heater 72, such as a Band/Ring Heater, e.g. Model No. 3682K26, Distributed by McMaster-Carr Supply Co., (see FIGS. 5 and 7), can be used to maintain blade 66 at a desired temperature during the cutting operation. Preferably, the blade is heated to a temperature within the range from 350° F. to 425° F., although other temperatures may be more appropriate, depending on the type of material being cut.

Additionally, portion 63 may be cut during a plurality of rotations of retreaded tire 54. However, to promote efficiency, it is desirable to rapidly move cutter 62 to the desired full depth of cut so that the entire portion 70 may be removed from retreaded tire 54 during the rotation of retreaded tire 54 through 360°–720°.

Furthermore, a single cutter 62 may be used to first cut portion 70 away from one side of retreaded tire 54 and then either the cutter may be moved or retreaded tire 54 may be rotated 180° in a transverse direction to present the opposite side to cutter 62. Thus, both contoured surfaces 64 would be cut in sequential operations. Additionally, a pair of cutters 62 could be used to simultaneously cut the pair of contoured surfaces 64 along the shoulder areas of retreaded tire 54. In the latter case, the second cutter 62 would be moved to the desired depth of cut during rotation of retreaded tire 54 similar to that described above with respect to use of a single cutter 62.

Cutter 62 and retreaded tire 54 can be engaged in a variety of ways or on a variety of mechanisms that would be understood by those of ordinary skill in the art. The general shape of the apparatus is not critical to the invention and could be constructed in multiple embodiments. One exemplary embodiment is illustrated schematically in FIG. 7. A tire trimming apparatus 74 includes a framework 76 having a base 78 and a generally vertical structure 80. Heater 72 and cutter 62 are mounted on vertical structure 80 via an actuator 82, such as a jackscrew, designed to move cutter 62 in a direction generally transverse to the direction of rotation of retreaded tire 54.

Figure 7:
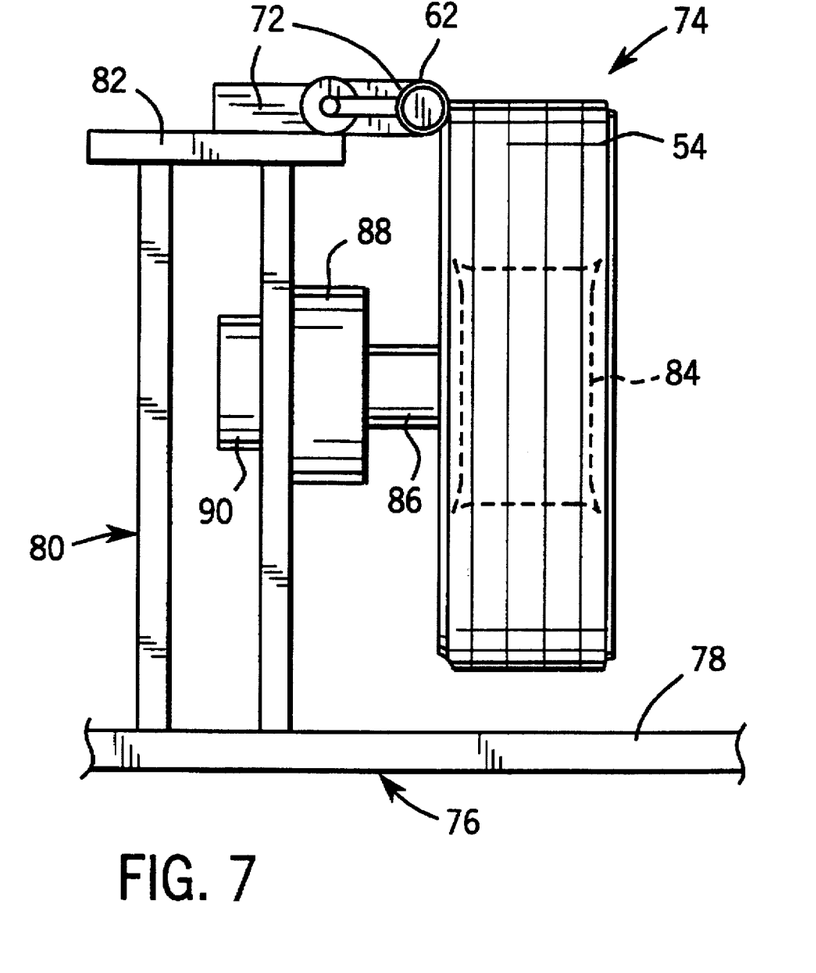
FIG. 7 is a schematic representation of the type of machine the cup cutter could be mounted on to perform the cutting process.

Tire trimming apparatus 74 preferably includes a releasable rim 84, such as the Model Accu-Band, and a releasable rim supplied by Bandag, Incorporated, for mounting of retreaded tire 54. Releasable rim 84 is mounted on a rotatable shaft 86 which, in turn, is rotatably mounted to vertical structure 80 by an appropriate mounting bracket 88. Shaft 86 is also coupled to a motor 90, preferably an electric motor although other motors, such as hydraulic or pneumatic motors, could also be used. Additionally, motor 90 can be connected to shaft 86 by a variety of mechanisms, such as bolts and pulleys, sprockets and chains, direct drives or other mechanisms known to those of ordinary skill in the art.

It will be understood that the foregoing description is of a preferred exemplary embodiment of this invention and that the invention is not limited to the specific forms shown. For example, the cutter may be moved along the tire while the tire is stationary, the cutter may be moved to its designated cutting depth prior to rotation of the tire, the cutters may be designed in a variety of shapes and configurations, various heating devices may be used for heating the blade of the cutter when necessary, the structure of the retreading apparatus also can be designed in myriad ways, depending on shop space constraints, combinations with other equipment, tire size and type, and whether there are single or multiple cutters. These and other modifications may be made in the design and arrangement elements of the apparatus without departing from the scope of the invention as expressed in the appended claims.

What is claimed is:

1. A method for contouring a shoulder of a retreaded tire having a tire casing, cushion gum and tread, the method comprising the steps of:

locating a cutter having a contoured edge proximate the shoulder of the retreaded tire, the retreaded tire having a tire casing, a cushion gum and tread, the tread having a width less than the tire casing forming a stepped region;

creating a relative movement between the cutter and the retreaded tire in the circumferential direction of the tire;

moving the cutter into the stepped region of the tire casing and cushion gum to a desired cutting depth; and cutting a portion of the stepped region of the tire casing and cushion gum away from the retreaded tire to create a continuous concave shoulder extending 360 degrees about the tire.

2. The method as recited in claim 1, further comprising the step of heating the cutter.

3. The method as recited in claim 2, wherein the step of heating the cutter includes heating the cutter to within the range from 350° Fahrenheit to 425° Fahrenheit.

4. The method as recited in claim 1, wherein the step of creating a relative movement includes the step of rotating the retreaded tire in a circumferential direction.

5. The method as recited in claim 4, wherein the step of rotating the retreaded tire includes rotating the retreaded tire at least 360° and less than 720°.

6. The method as recited in claim 4, wherein the step of rotating the retreaded tire includes rotating the retreaded tire at a speed in the range from approximately 8 to 72 revolutions per minute.

7. The method as recited in claim 1, further comprising the steps of:

locating a second cutter proximate a second shoulder of the retreaded tire;

creating a relative movement between the second cutter and the retreaded tire in the circumferential direction of the tire; and moving the second cutter into the second shoulder to a desired cutting depth.

8. The method as recited in claim 1, further comprising the step of cutting a portion of the tread.

9. A method for constructing a retreaded tire including the contouring of the shoulders of the retreaded tire, comprising the steps of:

removing old tire tread from a tire casing to present a buffed surface;

cutting a tread layer to a length sufficient to encircle the buffed surface along the circumference of the tire casing;

disposing a layer of cushion gum between the buffed surface and the tread layer;

applying the cushion gum and tread layer to the buffed surface, the tread layer having a width less than the width of the buffed surface to create a stepped region;

heating the combined tire casing, tread layer, and layer of cushion gum to form a vulcanized bond therebetween;

locating a cutter having a blade proximate at least one shoulder of the retreaded tire;

creating a relative movement between the cutter and the retreaded tire in the circumferential direction of the retreaded tire; and moving the blade towards the retreaded tire a sufficient distance to cut a portion of the stepped region of the tire casing and cushion gum to create a continuous concave surface extending from the tire casing to the tread layer and extending 360 degrees about the tire.

10. The method as recited in claim 9, further comprising the step of heating the blade.

11. The method as recited in claim 10, wherein the step of heating the blade includes heating the blade to within the range from 350° Fahrenheit to 425° Fahrenheit.

12. The method as recited in claim 9, wherein the step of creating a relative movement includes the step of rotating the retreaded tire in a circumferential direction.

13. The method as recited in claim 12, wherein the step of rotating the retreaded tire includes rotating the retreaded tire at least 360° and less than 720° during the cutting of the portion from the retreaded tire.

14. The method as recited in claim 9, further comprising the steps of:

locating a second cutter proximate a second shoulder of the retreaded tire;

creating a relative movement between the second cutter and the retreaded tire in the circumferential direction of the tire; and moving the second cutter into the second shoulder to a desired cutting depth.

15. The method as recited in claim 9, wherein the step of creating a relative movement includes the steps of:

mounting the retreaded tire on a rotatable rim; and rotating the rim.

16. The method as recited in claim 9, wherein the step of moving the cutter towards the retreaded tire includes cutting a portion of the tread.

* * * * *